United States Patent [19]

Nogami et al.

[11] 3,715,330

[45] Feb. 6, 1973

[54] SELF-THERMOSET UNSATURATED POLYESTERS AND METHOD FOR PREPARATION THEREOF

[75] Inventors: Sumitaka Nogami, Saitama; Shizuko Saito; Tooru Okada, both of Tokyo, all of Japan

[73] Assignee: Asahi Kasei Kogyo Kabushiki Kaisha, Tokyo, Japan

[22] Filed: May 10, 1971

[21] Appl. No.: 141,943

[30] Foreign Application Priority Data

May 20, 1970 Japan..................................45/42366

[52] U.S. Cl. ........260/40 R, 260/75 UA, 260/468 G, 260/871
[51] Int. Cl..............................................C08f 11/02
[58] Field of Search...260/75 UA, 871, 468 R, 468 G

[56] References Cited

UNITED STATES PATENTS

| 2,479,486 | 8/1949 | Gerhart............................260/871 X |
| 3,044,978 | 7/1962 | Hagele et al......................260/871 X |
| 3,287,395 | 11/1966 | Chang..............................260/871 X |
| 3,554,886 | 1/1971 | Colomb et al................260/75 UA X |

OTHER PUBLICATIONS

J. Bjorksten, ed., Polyesters and their Applications, Reinhold Publishing Corp., New York, 1956, pages 161, 163, & 170.

Primary Examiner—Morris Liebman
Assistant Examiner—S. M. Person
Attorney—James E. Armstrong and Ronald S. Cornell

[57] ABSTRACT

A stable self-thermoset unsaturated polyester resin having at least one terminal norbornene radical, is provided. The resin is characterized by excellent mechanical properties, making it useful as a component of coating compositions and fiber reinforced polyesters.

40 Claims, No Drawings

SELF-THERMOSET UNSATURATED POLYESTERS AND METHOD FOR PREPARATION THEREOF

BACKGROUND OF THE INVENTION

Conventionally, unsaturated polyester resins have been used as structural materials because of their excellent mechanical properties, heat resistance and chemical resistance.

In general, in practical application, unsaturated polyester resin is used as a highly cured article made of linear unsaturated polyester obtained by the reaction of unsaturated dibasic acids, saturated dibasic acids, glycols and vinyl or allyl compounds in the presence of a peroxide catalyst. It has been well known that the properties of the resin thus obtained vary with the kinds or/and portions of starting unsaturated dibasic acids, saturated dibasic acids and vinyl or allyl compounds.

In order to improve the properties of the resin, many attempts have been made to introduce various new dibasic acids, glycols and vinyl or allyl compounds. However, it is evident that the properties of the resin are affected by the vinyl or allyl monomer, which is an essential component for curing. Particularly, because common unsaturated polyester resin compositions contain styrene, the cured resin has drawbacks such as poor heat resistance and considerable thermal shrinkage, and for overcoming these drawbacks, an expensive curing monomer such as diallyl phthalate, tri-allyl cyanurate or divinyl benzene has been used. However the use of such curing monomers also has a limitation in use because of compatibility with particular unsaturated polyesters.

It is well known that the increase of the molecular weight of unsaturated polyester directly improves mechanical properties of the cured resin, but if the unsaturated polyester has too high a molecular weight, an increase in viscosity is unavoidable and as a result, compatibility with vinyl or allyl monomers and workability decrease. Moreover, adhesion to other reinforcing materials such as glass fibers, also decreases. Therefore, practical limitations on the use of such resins are recognized.

For overcoming such various drawbacks, a new type unsaturated polyester is required, namely, a self-thermoset unsaturated polyester, which is curable without the addition of a curing monomer such as vinyl or allyl monomer and which has a relatively lower molecular weight, in spite of being a cured resin, and excellent mechanical properties similar to those of cured resins made from polyesters having a high molecular weight.

It is known that unsaturated polyester prepared by a conventional polyester producing reaction with the additionof hydroxy dicyclopentadiene has a self-thermoset property. But this polyester requires a temperature of 140°C. or more and a considerably long period of time for curing; consequently its use for industrial purpose is not practical.

An unsaturated polyester has now been found having a new molecular structure. The novel polyester is useful as a component of coating materials and reinforcing laminates because of its self-thermoset properties even at relatively lower temperatures, its compatibility with curing monomers such as vinyl or allyl compounds and its adhesion to reinforcing materials such as glass fibers or various fillers. This polyester has also excellent stability in storage in the absence of a peroxide catalyst even in the presence of some heat.

SUMMARY

The unsaturated polyesters of the present invention are represented by the general formula (I)

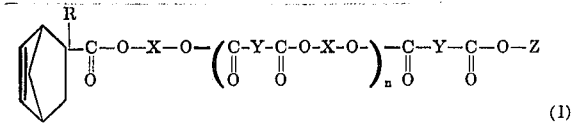

In the above formula R is a hydrogen atom or a lower alkyl group having one to six carbon atoms. X is at least one member selected from the group consisting of linear and branched alkylene or oxyalkylene radicals having one to 12 carbon atoms, cycloaliphatic radicals having four to six carbon atoms,

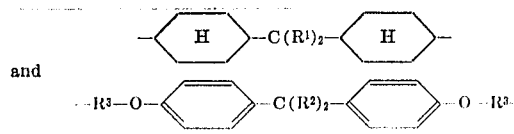

wherein $R^1$ and $R^2$ are hydrogen or alkyl radicals having one to three carbon atoms and $R^3$ is a linear or branched alkylene radical having two to three carbon atoms. Y is at least one member selected from the group consisting of alkylene radicals having two to 10 carbon atoms, phenylene, cyclohexylene, and linear and branched alkenylene radicals having two to three carbon atoms, at least 20 mole percent preferably more than 50 mole percent of said Y members being alkenylene radicals. Z is a hydrogen atom, a lower alkyl radical or

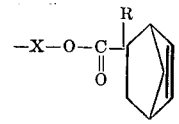

wherein R is as defined above, and $n$ is an integer of 0 to 50, preferably 0 – 20.

The polyesters of the present invention are prepared by reacting a norbornene compound having the general formula (II);

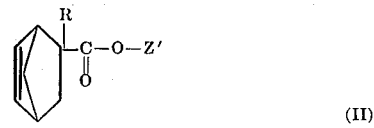

wherein R is as defined above and Z' represents a hydrogen atom, a lower alkyl radical having one to six carbon atoms or a hydroxyalkyl radical having one to six carbon atoms, and an unsaturated polyester having the general formula (III)

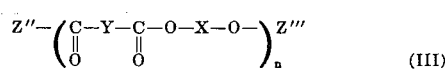

wherein X and Y are as defined above, Z'' is a hydroxyl radical or —O—X—OH wherein X is as defined above, and Z''' is a hydrogen atom or

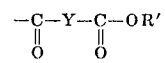

wherein Y is as defined above and R' is a hydrogen atom or a lower alkyl radical having one to three carbon atoms.

Another method for preparing the polyesters of the present invention comprises reacting the norbornene compound having the general formula (II) with the glycols and acids used to prepare unsaturated polyester (III), thereby forming (III) in situ.

DETAILED DESCRIPTION

Norbornene compounds represented by the general formula (II) are prepared in good yield by a Diels-Alder reaction between cyclopentadiene and an acrylic or -substituted acrylic acid or esters thereof such as acrylic acid, methyl acrylate, ethyl acrylate, propyl acrylate, butyl acrylate, pentyl acrylate, hexyl acrylate, 2-hydroxyethyl acrylate, 2- or 3- hydroxypropyl acrylate, methacrylic acid, methyl methacrylate, methyl α-ethyl acrylate, α-butyl acrylic acid, α-hexylacrylic acid, methyl α-hexyl acrylate, 2-hydroxyethyl methacrylate or the like.

The unsaturated dibasic acids used in preparing polyesters (III) used in the present invention include maleic acid, maleic anhydride, itaconic acid, itaconic anhydride, citraconic acid, citraconic anhydride and fumaric acid. Furthermore lower alkyl esters of these acids may be used. The acids or esters can be used individually or as mixtures.

The glycols used in preparing polyesters (III) used in the invention are aliphatic glycols such as ethylene glycol, 1,2- and 1,3-propylene glycol, 1,3-, 1,4- and 2,3-butanediol, 1,5-pentanediol, 1,6-hexanediol, 1,7-heptanediol, 1,8-octanediol, 1,9-nonanediol, 1,2-decanediol, 1,12-dodecanediol, neopentyl glycol and the like; aliphatic ether glycols such as diethylene glycol, triethylene glycol, dipropylene glycol and the like; cycloaliphatic glycols such as 1,2-, 1,3-, 1,4-cyclohexanediol and the like; and glycols having the formula,

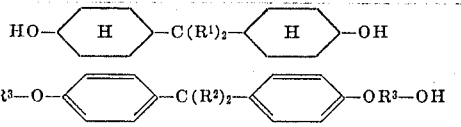

wherein $R^1$ and $R^2$ represent a hydrogen atom or an alkyl radical having one to three carbon atom and $R^3$ represents atoms or branched alkylene radicals having two to three carbon atoms, such as hydrogenated Bisphenol A, bis-(4-hydroxycyclohexyl) methane, 2,2-bis-(p-hydroxypropoxyphenyl) propane and the like. These glycols can be used alone or as mixtures. Of the foregoing, it is preferable to use ethylene glycol, propylene glycol, diethylene glycol or/and neopentyl glycol.

The saturated dibasic acids which are used in preparing polyesters (III) used in the present invention are dibasic aliphatic acids or anhydrides such as succinic acid, adipic acid, pimelic acid, suberic acid, azelaic acid, sebacic acid, dodecanedionic acid, succinic anhydride and the like; aromatic dicarboxylic acids or anhydrides such as phthalic acid, phthalic anhydride, isophthalic acid, terephthalic acid; alkyl derivatives thereof; and alicyclic dibasic acids such as 1,2-, 1,3- and 1,4-cyclohexane dicarboxylic acid and the like. The corresponding esters can also be used. The acids or esters can be used alone or as mixtures.

In the case of the reaction of the norbornene compound (II) and the unsaturated polyester (III), if a norbornene compound having a hydroxy alkyl ester is used, a polyester having terminal carboxyl radical should be used, and if a norbornene compound having free carboxyl radicals or alkyl carboxyl radicals is used, a polyester having terminal hydroxy radical should be used.

The ester forming reaction can be accomplished using substantially stoichiometric amounts of the compounds containing the radicals actually reacted as carboxylic acid component and the compound having hydroxy groups. If excess amounts of the hydroxy compound with respect to the acid component is used, the excess of the hydroxy compound can be removed by evaporation after the reaction.

The unsaturated polyester (I) must contain one or two terminal norbornene radicals and at least 20 mole percent, preferably more than 50 mole percent of alkenylene bonds resulting from the unsaturated dibasic acid, because the self-thermoset property depends on both of these factors.

If less than 20 mole percent of alkenylene bonds are present in the molecule of the polyester (I), there cannot be obtained desirable self-thermoset properties.

The number of polyester units of unsaturated polyester (I), which is represented by $n$ in the general formula (I) and which affects compatibility with a vinyl or allyl monomer and workability, is an integer of 0 to 50, preferably 0 to 20. If the number is greater than 50, both of these properties are adversely affected.

Organic triols or tetraols such as trimethylolpropane, glycerine, trimethylolethane, pentaerythritol, sorbitol and the like, and organic tribasic or tetrabasic acids, such as trimellitic acid, pyromellitic acid, biphenyltetracarboxylic acid and the like, can be used for modification of the resulting polyester in addition to above mentioned components used in the ester forming reaction. In this case, the dibasic acid components and the glycol components are partly replaced by the tribasic or tetrabasic acid and the triol or tetraol respectively in an amount of 2 to 15 mole percent, preferably 5 to 10 mole percent to improve Izod strength.

For controlling the viscosity of the polyester, organic mono-alcohol or monobasic acids may be used in the polyester forming reaction. In this case, the norbornene compound can be partly replaced by the mono-functional compound in an amounts of 5 to 50 mole percent, preferably 10 to 40 mole percent.

The foregoing reactions are carried at a temperature between 100 to 250°C, preferably 120 to 210°C. under a pressure of 0.001 to 3.0 atmospheres, preferably 0.01 to 1.5 atmospheres.

At the beginning of the reaction the is generally conducted at atmospheric pressure or under a slight positive pressure. In order to drive the reaction to completion the reaction is generally completed under reduced pressure to effect removal of water or a lower alcohol which is formed during the esterification or ester interchange reaction. The stage at which reduced pressure is used varies with the particular glycol or glycols present in the reaction mixture. If it is necessary, an esterification catalyst such as calcium acetate or zinc acetate, or ester interchange catalyst such a manganese oxide, can be used.

The unsaturated polyesters (I) are very stable on lapse of time even when subjected to some heat. Some of them are solids having a definite softening point.

However, in the presence of a peroxide catalyst such as benzoyl peroxide, di-tert-butyl peroxide, methylenthylketone peroxide, cyclohexanone peroxide and the like, the unsaturated polyesters (I) are easily cured even under lower temperatures such as 80°C. to yield a cured resin which is clear, hard and low in shrinkage, and maximum exothermo-peak temperature is observed.

If desired, vinyl or allyl monomers including styrene, vinyltoluene, chlorostyrene, α-methylstyrene, divinylbenzene, vinylacetate, diallyl benzene phosphonate, N-vinyl pyrolidone, maleimide, methyl acrylate, ethyl acrylate, methyl methacrylate, diallyl phthalate, triallyl cyanurate and the like, may be added to the curing composition in an amount of up to 60 weight percent, preferably 5 to 50 weight percent of the total mixture of resin and monomer to improve tensile strength and tensile modulus.

In this case, the molecular weight of the polyesters can be made considerably lower than those of conventional unsaturated polyesters up to the extent that the resulting cured resin beings to lose its excellent physical properties. Therefore, the dope viscosity of the curing composition can be kept low to yield void-free cured products when the reinforcing materials are added in the composition. The reinforcing materials include such materials as glass fiber, glass cloth, carbon fiber, asbestos fiber, ceramic fiber, metal fiber, whisker and synthetic or natural organic fiber, and can be used in an amount of 10 to 80 weight percent, preferably 15 to 70 weight percent of the resulting composition.

The invention is illustrated more particularly by way of the following examples.

EXAMPLE 1

Sixty six g. (1 mole) of cyclopentadiene, 116 g. (1 mole) of 2-hydroxyethyl acrylate and 4 g. of hydroquinone were charged to an autoclave and allowed to stand for a day at 80°C. The resulting reaction mixture was distilled to yield the corresponding 2-hydroxyethyl norbornene carboxylate having a boiling point of 78–82°C./4 mmHg. in 80 percent of theoretical yield.

One hundred and eighty two g. (1 mole) of the 2-hydroxyethyl norbornene carboxylate thus obtained, 98 g. (1 mole) of maleic anhydride and 34 g. (0.55 mole) of ethylene glycol were reacted at 200°C. for 4 hours to yield the following unsaturated polyester having an acid value of 25, a viscosity of 8000 cp at 25°C. and an average molecular weight of 600 measured by the "Vapor Pressure Osmometer" (Model 302 produced by Mechrolab Co., Ltd.) in CHCl$_3$ at 37°C. using polyethylene glycol as a standard. The structure of the polyester is represented by the following formula;

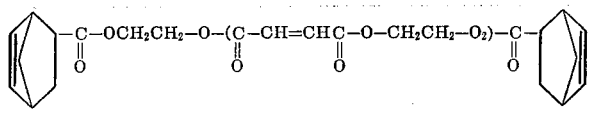

The resulting unsaturated polyester was subjected to a curing test by the S.P.I. method ['Polyester Resin' page 41 on 15th of June 1961 published by The Nikkan Kogyo (The Industrial Daily News)]. 0.5 g. of benzoyl peroxide was dissolved in 50 g. of the sample of the unsaturated polyester obtained above, and the resulting composition was placed in a test tube having an 18 mm inside diameter and a length of 150 mm and to the extent of 100 mm from the bottom and a thermo-couple was inserted in the center of the tube.

The test tube was placed in a bath kept at 80°C. and the ex-othermo-peak point which was caused by the cross-linking reaction, was measured by means of the thermo-couple. The results are shown in the Table 1.

In the same time, an unsaturated polyester having an acid value of 20 prepared by the reaction of 66 g. of ethylene glycol and 98 g. of maleic anhydride, and an unsaturated polyester having an acid value of 18 prepared by the reaction of 315 g. of hydroxy-dicyclopentadiene, 196 g. of maleic anhydride and 76 g. of propylene glycol were tested by the same method. The results of the tests are shown in the Table 1 as Comparative Examples 1 and 2, respectively.

TABLE 1

| | [1] Minimum cross-linking time (sec.) | [2] Maximum exothermo-peak temperature (°C) |
|---|---|---|
| Example 1 | 167 | 155 |
| Comparative Example 1 | — | not observed |
| Comparative Example 2 | — | " |

[1] Minimum cross-linking time means time between that when the internal temperature of the resin reaches 65°C and the maximum exothermo-peak temperature.
[2] Maximum exothermo-peak temperature means the highest temperature inside of the resin detected by the thermo-couple.

EXAMPLE 2

Seventy two g. (1 mole) of acrylic acid was charged to a 500 ml four-necked flask equipped with a stirrer, a thermometer, a tap funnel and a condenser, and 66 g. (1 mole) of cyclopentadiene was added portionwise at 10°C. under cooling for 2 hours.

The mixture was stirred further for one hour. The resulting reaction mixture was distilled to yield the corresponding 5-norbornene 2-carboxylic acid having a boiling point of 14°C./11 mmHg.

Separately 98 g. (1 mole) of maleic anhydride, 68 g. (1.1 mole) of ethylene glycol, 83 g. (0.5 mole) of isophthalic acid and 84 g. (1.1 mole) of 1,3-propylene glycol were reacted at 200°C. for 10 hours and thereafter the esterification reaction was carried out with the addition of 138 g. (1 mole) of 5-norbornene 2-carboxylic acid and obtained above at 200°C. for 2 hours. The resulting polyester has an acid value of 10, a viscosity of 5000 cp at 25°C. and an average molecular weight of 850 to 1000. The structure of the polyester is persumed that X are —CH$_2$—CH$_2$— and —CH$_2$—CH$_2$—CH$_2$— in a proportion of 1:1; Y are —CH=CH— and

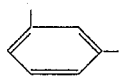

in a proportion of 2:1; almost both terminals are

and $n$ is 2 in the formula (I).

The curing test was done using same method described in Example 1 and the results were 300 sec. for the minimum cross-linking time and 160°C. for the maximum exothermo-peak temperature, and a clear hard solid was obtained.

EXAMPLE 3

An unsaturated polyester having an acid value of 12.8, a viscosity of 7000 cp at 25°C. and an average molecular weight of 700 was obtained in same manner as Example 1 except that 65 g. of itaconic acid and 58 g. of fumaric acid were used in place of 98 g. of maleic anhydride. The structure of the polyester is represented by the following formula;

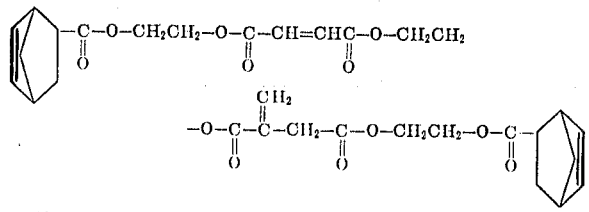

The curing test was done using the same method described in Example 1 and the results were 210 sec. for the minimum cross-linking time and 160°C. for the maximum exothermo-peak temperature, and a clear hard solid was obtained.

EXAMPLE 4

66 g. of dicyclopentadiene and 4 g. of hydroquinone were charged in a 1-litter four necked-flask equipped with a stirrer, a thermometer, a tap funnel and a condenser, 130 g. of 2-hydroxypropyl acrylate was dropped portionwise for 1 hour with stirring under reflux at 180°C. After that the resulting reaction mixture was distilled to yield 150 g. of the corresponding 2-hydroxypropyl 5-norbornene 2-carboxylate having a boiling point of 115–118°C./3 mmHg.

Ninety one g. (0.465 mole) of 2-hydroxypropyl 5-norbornene 2-carboxylate and 24 g. (0.203 mole) of maleic acid were reacted at 180–200°C. for 6 hours to yield a light yellow fluid unsaturated polyester having an acid value of 8.2. The structure of the polyester is represented by the following formula;

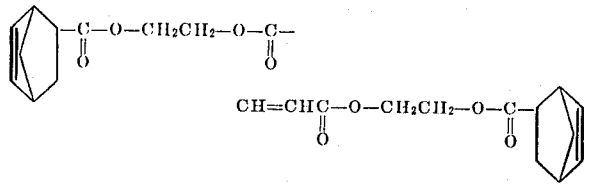

0.5 g. of benzoyl peroxide was added to the polyester obtained above and the gel test was done using the method described in Example 1. As a result, the minimum cross-linking time is 120 sec. and the maximum exothermo-peak temperature is 180°C. and the resulting cured resin had a specific gravity of 1.23 and the volume shrinkage was 2.0 percent.

EXAMPLE 5

Sixty six g. of cyclopentadiene and 88 g. of methyl acrylate were heated at 80°C. for one day in the presence of 2 g. of hydroquinone in an autoclave. The resulting reaction mixture was distilled to yield 120 g. of the corresponding methyl 5-norbornene 2-carboxylate having a boiling point of 60–65°C./4 mmHg.

Three hundred and eight g. (2.08 mole) of methyl 5-norbornene 2-carboxylate was added to the unsaturated polyester having an acid value of 10 prepared by the polyesterification reaction of 98 g. (1 mole) of maleic anhydride and 168 g. (2.2 mole) of 1,2-propylene glycol, and reacted at 150°C. for 4 hours in the presence of 0.6 g. of calcium acetate as an ester interchange catalyst to yield a light yellow viscous fluid material having the following structure.

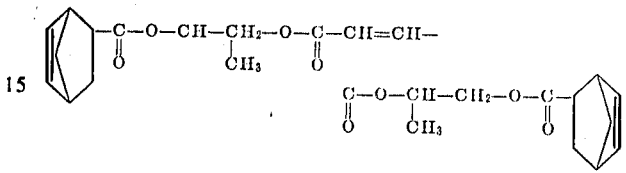

0.5 g. of benzoyl peroxide was added to 50 g. of the material obtained above, and the curing test was done using the method described in Example 1. It was found that the minimum cross-linking time was 180 sec. and the maximum exothermo-peak temperature was 220°C.

In contrast the untreated unsaturated polyester did not show any maximum exothermo-peak temperature and did not cure.

EXAMPLE 6

One hundred and thirty g. (1 mole) of 2-hydroxyethyl methacrylate was dropped portionwise into a mixture of 66 g. (0.5 mole) of dicyclopentadiene and 4 g. of hydroquinone for 1 hour under reflux at 160°C. The resulting reaction mixture was distilled to yield 160 g. of 2-hydroxyethyl 2-methyl-5-norbornene 2-carboxylate having a boiling point of 115–118°C./3 mmHg.

One hundred and ninety six g. (1 mole) of the norbornene compound thus obtained, 98 g. (1 mole) of maleic anhydride and 34 g. (0.55 mole) of ethylene glycol were subjected to the polyesterification reaction in a manner similar to that described in Example 1 to yield an unsaturated polyester having an acid value of 20. The structure of the unsaturated polyester is represented by the following.

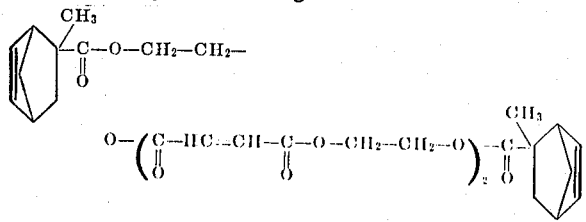

The curing test was done using the same method as in Example 1 and the results were 225 sec. for the minimum cross-linking time and 180°C. for the maximum exothermo-peak temperature.

EXAMPLE 7

One hundred and forty four g. of 2-hydroxyethyl α-ethylacrylate was dropped into a mixture of 66 g. of dicyclopentadiene and 4 g. of hydroquinone for 1 hour under reflux at 180°C. Then, the reaction mixture was distilled to yield 170 g. of 2-hydroxyethyl 2-ethyl-5-norbornene 2-carboxylate.

The unsaturated polyester was prepared in a manner similar to that described in Example 1, except that 200 g. of 2-hydroxyethyl 2-ethyl-5-norbornene 2-carboxylate was used in place of the 2-hydroxyethyl 5-norbornene 2-carboxylate used in Example 1. The structure of the polyester is represented by the following formula;

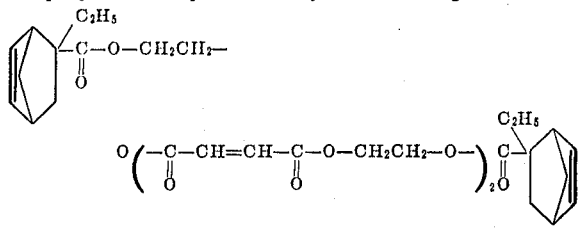

The curing test was done using the same method described in Example 1 and the results were 180 sec. for the minimum cross-linking time and 160°C. for the maximum exothermo-peak temperature.

EXAMPLE 8

Eighty nine g. (0.35 mole) of bis 2-hydroxyethyl terephthalate and 32.5 g. (0.28 mole) of fumaric acid were subjected to the esterification reaction at 200–210°10 hours and thereafter to the ester interchange reaction with the addition of 21.3 g. (0.14 mole) of methyl 5-norbornene 2-carboxylate and 0.04 g. of manganese acetate at 200°C. for 4 hours and thereafter at 200°C. under 3–5 mm Hg. for 1.5 hours to yield an light yellow solid unsaturated polyester having softening point of 50–55°C. and an average molecular weight of 1800.

IR absorption spectra and NMR spectra support the structure that X is —$CH_2$—$CH_2$—; Y are —CH=CH and

in a proportion of 1:1; both terminals are

and n is 4 in the formula (I).

One gram of di-tert-butyl peroxide was added to 100 g. of the polyester obtained above and heated at 150°C. After 10 minutes the inside temperature rose to 153°C. and a hard and clear resin was produced.

EXAMPLE 9

Sixty six g. (1 mole) of cyclopentadiene and 156 g. (1 mole) of α-hexylacrylic acid were reacted at 180°C. for 1 day in an autoclave. The resulting reaction mixture was a viscous fluid and was identified as 2-hexyl-5-norbornene 2-carboxylic acid by means of IR absorption spectra and any unreacted cycolpentadiene was not detected by gas chromatography.

A mixture of 222 g. (1 mole) of the norbornene compound obtained above, 130 g. (1 mole) of citraconic acid, 100 g. (0.5 mole) of sebacic acid, 99 g. (1.1 mole) of butanediol-1,4 and 114 g. (1.1 mole) of neopentylglycol was subjected to the esterification reaction at 210°C. for 12 hours to yield a light yellow solid having a softening point of 40–45°C. The structure of the polyester obtained above is presumed that X are —$(CH_2)_4$— and

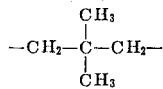

in a proportion of 1:1; Y are

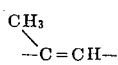

and —$(CH_2)_8$— in a portion of 2:1; both terminals are

, and n is 2 in the formula (I).

One gram of di-tert-butyl peroxide was added to 100 g. of the solid material obtained above and the mixture was heated at 100°C. to yield a hard, clear cured resin after 30 minutes.

EXAMPLE 10

29.2 g. (0.2 mole) of adipic acid, 29.6 g. (0.2 mole) of phthalic anhydride, 31 g. (0.2 mole) of hexahydrophthalic anhydride, 39.2 g. (0.4 mole) of maleic anhydride, 30 g. (0.48 mole) of ethylene glycol, 25.5 g. (0.25 mole) of diethylene glycol, 57 g. (0.24 mole) of hydrogenated Bisphenol A and 78 g. (0.24 mole) of 2,2-di-(4-hydroxypropoxyphenyl) propane were mixed and subjected to the polyesterification reaction at 230°C. for 12 hours and thereafter subjected to the esterification reaction with the addition of 49 g. of 5-norbornene 2-carboxylic acid for an additional 2 hours to yield a light yellow solid having a softening point of 55–60°C. The structure of the polyester obtained above is presumed that X are —$CH_2$—$CH_2$—, $CH_2CH_2OCH_2CH_2$— ,

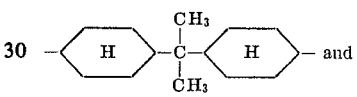

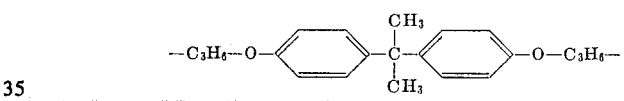

in a proportion of 1:1:1:1; Y are —CH=CH— , —$(CH_2)_4$—.

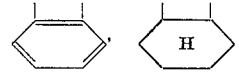

in a proportion of 2:1:1:1; both terminals are

, and n is 4 in formula (I).

One gram of dicumyl peroxide was added to the solid obtained above and the mixture was heated at 150°C. After 5 minutes the inside temperature rose to 240°C, and a hard, clear resin was produced.

EXAMPLE 11

A mixture of 263 g. (1.1 mole) of bis 2-hydroxyethyl terephthalate and 116 g. (1.0 mole) of fumaric acid were subjected to the esterification reaction at 200°C. for 8 hours to yield an unsaturated polyester having an acid value of 14.5.

30.4 g. (0.2 mole) of methyl 5-norbornene 2-carboxylate, 0.12 g. of manganese acetate and 0.2 g. of hydroquinone were added to the reaction mixture and heated at 160–190°C. for 4 hours for the ester interchange reaction and further for 2 hours under 5 mmHg. to yield an unsaturated polyester having an acid value of 8.0 and a softening point of 50–60°C.

IR spectra and NMR spectra support the structure that X is —$CH_2$—$CH_2$—; Y are —CH=CH— and

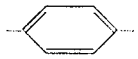

in a proportion of 1:1; almost both terminals are

and n is 13 in the formula (I).

One gram of cumene peroxide was added to 100 g. of the unsaturated polyester obtained above and heated at 150°C. It was observed that the minimum cross-linking time was 12 minutes and the maximum thermo-peak temperature was 260°C.

EXAMPLE 12

A mixture of 132 g. (1 mole) of 5-norbornene 2-carboxylic acid, 98 g. (1 mole) of maleic anhydride, 168 g. (2.2 moles) of 1,2-propylene glycol and 83 g. (0.5 mole) of isophthalic acid was reacted at 200°C. for 18 hours to yield an unsaturated polyester having an acid value of 7 and a viscosity of 1000 cp. IR and MMR spectra support the structure that X is $$-CH_2-CH-$$
$$\qquad\ \ \ \ |$$
$$\qquad\ \ \ \ CH_3$$

Y are —CH=CH— and

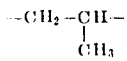

in a proportion of 2:1; almost both terminals are

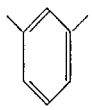

; and n is 2 in the formula (I).

The curing test was carried out and the results were 300 sec. for the minimum cross-linking time and 180°C. for the exothermopeak temperature.

EXAMPLE 13

If methyl isophthalate was substituted for isophthalic acid used in Example 12, a product having substantially identical properties was obtained.

EXAMPLES 14–18

A series of useful polymers can be made by selecting the reactants indicated below and following the procedure of the previous examples:

EXAMPLE 19

A mixture of 70 g. of the norbornene terminated unsaturated polyester obtained in Example 1, 30 g. of styrene and 1 g. of benzoyl peroxide having a viscosity of 100 cp at 25°C. and a specific gravity of 1.105 was heated at 70°C. for 2 hours and at 110°C. for an additional 2 hours to yield a cured material having specific gravity of 1.17.

Physical properties are shown in Table 3.

TABLE 3

| Tensile strength (kg/cm²) | Flexural strength (kg/cm²) | Barcol hardness (GIZJ-9341) | Charpy impact strength (kg cm/mm²) |
|---|---|---|---|
| 1820 | 1020 | 65 | 217 |

EXAMPLE 20

Twelve pieces of glass cloth (15 × 20 cm²) (Nippon Glass Fiber Co., Ltd.: Satin Glass Cloth CL-005) were piled with a homogenous mixture of 70 g. of the norbornene terminated unsaturated polyester obtained in Example 2, 30 g. of styrene and 1 g. of benzoyl peroxide having a viscosity of 500 cp at 25°C. to produce a piled article containing 65 percent by weight of above mentioned polyester composition. The piled article was heated at 80°C. for 2 hours and 110°C. for an additional 1 hour for curing.

For comparison, the unsaturated polyester obtained in Example 2 prior to the addition of the norbornene compound was treated in the same manner described above.

Physical properties of the cured piled articles are shown in Table 4.

TABLE 4

| | Viscosity of the composition (cp.) | Barcol hardness (GIZJ-9341) | Tensile strength (kg./mm.²) | Tensile modulus (kg./mm.²) | Flexural strength (kg./mm.²) | Flexural modulus (kg./mm.²) |
|---|---|---|---|---|---|---|
| Example | 500 | 67 | 36.20 | 1,062 | 48.1 | 2,020 |
| Comparative example | 7,000 | 68 | 29.80 | 867 | 41.5 | 1,850 |

EXAMPLE 21

Premixed composite materials were prepared by adding 30 g. of styrene and 1 g. of benzoyl peroxide to 70 g. of the norbornene terminated unsaturated polyester obtained in Example 5. 34 g. of the unsaturated polyester composition thus obtained was intimately admixed with 20 g. of glass fiber (Nippon glass fiber Co., Ltd. ½ inch chopped strand), 45 g. of calcium carbonate and 1 g. of zinc stearate by means of a kneader.

The premixed composite materials were molded at 110°C. for 10 minutes under 150 kg/cm².

Physical properties of the molded article are shown in Table 5. The resin of the invention was compared with a molded article prepared by a process similar to that described above except that the unsaturated polyester not containing any terminal norbornene radical was used.

TABLE 5

| | Flexural strength (kg/mm²) | Flexural modulus (kg/mm²) | Compression strength (kg/mm²) | Charpy impact strength (kg cm/cm²) |
|---|---|---|---|---|
| Example | 16.7 | 1300 | 17.0 | 28.9 |
| Comparative example | 8.5 | 650 | 11.8 | 27.2 |

What is claimed is:

1. An unsaturated polyester of the general formula (I)

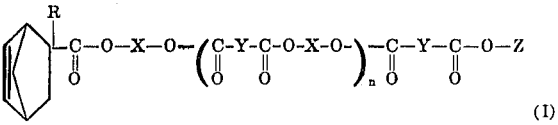

(I)

wherein R is a hydrogen atom or an alkyl group having one to six carbon atoms; X is at least one member selected from the group consisting of linear and branched alkylene or oxyalkylene radicals having two to 12 carbon atoms, cycloaliphatic radicals having four to six carbon atoms,

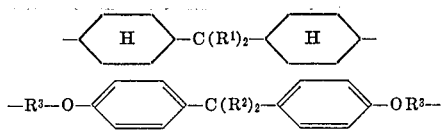

wherein $R^1$ and $R^2$ are hydrogen or alkyl radicals having one to three carbon atoms and $R^3$ is a linear or branched alkylene radical having two to three carbon atoms; Y is at least one member selected from the group consisting of alkylene radicals having two to 10 carbon atoms, a phenylene radical, a cyclohexylene radical, and linear and branched alkylene radicals having two to three carbon atoms, at least 20 mole percent of said members being alkenylene radicals; Z is a hydrogen atom, a lower alkyl radical having one to three carbon atoms or

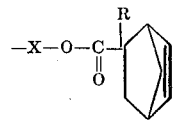

wherein R and X are as defined above; and n is an integer of 0 to 50.

2. The unsaturated polyester as claimed in claim 1, wherein more than 50 mole percent of Y are alkenylene radicals.

3. The unsaturated polyester as claimed in claim 1, wherein the integer n is 0 to 20.

4. The unsaturated polyester as claimed in claim 1, wherein Z is

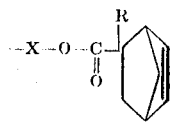

wherein X and R are as defined in claim 1.

5. The unsaturated polyester as claimed in claim 1, wherein R is a hydrogen atom.

6. The unsaturated polyester as claimed in claim 1, wherein R is —$CH_3$.

7. The unsaturated polyester as claimed in claim 1, wherein X is at least one member selected from the group consisting of —$(CH_2)_{n'}$—, wherein $n'$ is an integer 2 to 12, $$-CH_2-CH-,\quad -CH-CH- \atop \phantom{-}CH_3 \phantom{-}\phantom{CH}CH_3\ CH_3$$

—$CH_2$—$CH_2$—$CH$—, —$(CH_2CH_2O)_n$—$CH_2CH_2$— wherein $n''$ is an integer of 1 to 2, -$CH_2CH_2CH_2$-O-$CH_2CH_2CHC_2$-, $$-\!\!\left\langle{}_H{}\right\rangle\!\!-\!\!\underset{CH_3}{\overset{CH_3}{C}}\!\!-\!\!\left\langle{}_H{}\right\rangle\!\!-$$

and $$-C_3H_6-O-\!\!\left\langle\ \right\rangle\!\!-\underset{CH_3}{\overset{CH_3}{C}}\!\!-\!\!\left\langle\ \right\rangle\!\!-O-C_3H_6-$$

1,2-, 1,3-, 1,4-cyclohexylene.

8. The unsaturated polyester as claimed in claim 1, wherein Y is at least one member selected from the group consisting of —$(CH_2)_n$— wherein $n'''$ is an integer of 2 to 10, ortho-, meta-or para-phenylene radical, 1,2-, 1,3- or 1,4- cyclohexylene radical, —CH=CH—, $$-CH=C-\quad \text{and}\quad -CH_2-C-\atop \phantom{-}CH_3 \phantom{and -CH_2-}\|\atop\phantom{-CH_2-}CH_2$$

9. The unsaturated polyester as claimed in claim 1, wherein R is a hydrogen atom, X is —$CH_2CH_2$— and Y is —CH=CH—.

10. The unsaturated polyester as claimed in claim 1, wherein R is —$CH_3$, X is —$CH_2CH_2$— and Y is —CH=CH—.

11. The unsaturated polyester as claimed in claim 1, wherein R is —$C_2H_5$, X is —$CH_2CH_2$— and Y is —CH=CH—.

12. The unsaturated polyester as claimed in claim 1, wherein R is a hydrogen atom, X is a mixture of —$CH_2CH_2$— and —$C_3H_6$— and Y is a mixture of —CH=CH— and $$-\!\!\left\langle\ \right\rangle\!\!-$$

13. The unsaturated polyester as claimed in claim 1, wherein R is a hydrogen atom, X is —$CH_2CH_2$— and Y is a mixture of $$-C-CH_2-\atop \|\atop CH_2$$

and —CH=CH—.

14. The unsaturated polyester as claimed in claim 1, wherein R is a hydrogen atom, X is —$C_3H_6$— and Y is —CH=CH—.

15. The unsaturated polyester as claimed in claim 1, wherein R is a hydrogen atom, X is —$C_3H_6$— and Y is a mixture of —CH=CH— and $$-\!\!\left\langle\ \right\rangle\!\!-$$

16. The unsaturated polyester as claimed in claim 1, wherein R is a hydrogen atom, X is —$CH_2CH_2$— and Y is a mixture of —CH=CH— and $$-\!\!\left\langle\ \right\rangle\!\!-$$

17. The unsaturated polyester as claimed in claim 1, wherein R is —$C_6H_{13}$, X is a mixture of $$-CH_2-\underset{CH_3}{\overset{CH_3}{C}}-CH_2-\ \text{and}\ -(CH_2)_4-$$

and Y is a mixture of $$-\underset{CH_3}{\overset{}{C}}=CH-\ \text{and}\ -(CH_2)_8-$$

18. The unsaturated polyester as claimed in claim 1, wherein R is a hydrogen atom, X is a mixture of —$CH_2CH_2$—, —$CH_2CH_2OCH_2CH_2$—, $$-\!\!\left\langle{}_H{}\right\rangle\!\!-\underset{CH_3}{\overset{CH_3}{C}}\!\!-\!\!\left\langle{}_H{}\right\rangle\!\!-$$

and $$-C_3H_6-O-\!\!\left\langle\ \right\rangle\!\!-\underset{CH_3}{\overset{CH_3}{C}}\!\!-\!\!\left\langle\ \right\rangle\!\!-O-C_3H_6-$$

and Y is a mixture of —$(CH_2)_4$—, —CH=CH—, $$\left\langle\ \right\rangle\ \text{and}\ \left\langle{}_H{}\right\rangle$$

19. The unsaturated polyester as claimed in claim 1, wherein R is a hydrogen atom, X is $$-\!\!\left\langle{}_H{}\right\rangle\!\!-$$

and Y is a mixture of —CH=CH— and —$CH_2CH_2$—.

20. The unsaturated polyester as claimed in claim 1, wherein R is a hydrogen atom, X is $$-CH_2-\underset{CH_3}{\overset{CH_3}{C}}-CH_2-$$

and Y is a mixture of —CH=CH— and —$(CH_2)_{10}$—.

21. The unsaturated polyester as claimed in claim 1, wherein R is —$CH_3$, X is —$CH_2CH_2OCH_2CH_2OCH_2CH_2$— and Y is —CH=CH—.

22. The unsaturated polyester as claimed in claim 1, wherein R is —$CH_3$, X is —$CH_2CH_2$— and Y is a mixture of $$-CH=C-\atop \phantom{-CH=}CH_3\quad \text{and}\ -\!\!\left\langle\ \right\rangle\!\!-$$

23. The unsaturated polyester as claimed in claim 1, wherein R is a hydrogen atom, X is —CH₂CH₂OCH₂CH₂ and Y is

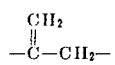

24. An unsaturated polyester as claimed in claim 1, wherein the polymer (I) is dissolved in a vinyl or allyl monomer, the amount of said monomer being up to 60 weight percent of the total weight of the polymer (I) and the monomer.

25. An unsaturated polyester as claimed in claim 1, wherein the polymer (I) is dissolved in a vinyl or allyl monomer, the amount of said monomer being 5 to 50 weight percent of the total weight of the polymer (I) and the monomer.

26. The unsaturated polyester as claimed in claim 24, wherein said vinyl or allyl monomer is at least one member selected from the group consisting of styrene, vinyl toluene, chlorostyrene, α-methylstyrene, divinylbenzene, vinyl acetate, diallylbenzene phosphonate, N-vinylpyrolidone, maleimide, methyl acrylate, ethyl acrylate, methyl methacrylate, diallyl phthalate and triallyl cyanurate.

27. The unsaturated polyester as claimed in claim 25, wherein said vinyl or allyl monomer is styrene.

28. A fiber reinforced unsaturated polyester as claimed in claim 1, wherein the polymer (I) as claimed in claim 24 is intimately admixed with a reinforcing material, the amount of said reinforcing material being 10 to 80 weight percent of the total weight of the polymer (I) as claimed in claim 24 and the reinforcing material.

29. A fiber reinforced unsaturated polyester as claimed in claim 1, wherein the polymer (I) as claimed in claim 25 is intimately admixed with a reinforcing material, the amount of said reinforcing material being 15 to 70 weight percent of the total weight of the polymer (I) as claimed claim 25 and the reinforcing material.

30. The fiber reinforced unsaturated polyester as claimed in claim 29, wherein the reinforcing material is at least one member selected from the group consisting of glass fiber, glass cloth, carbon fiber, asbestos fiber, ceramic fiber, metal fiber, whisker and synthetic or natural organic fiber.

31. The fiber reinforced polyester of claim 29, wherein said reinforcing material is glass fiber.

32. The fiber reinforced polyester of claim 29, wherein reinforcing material is glass cloth.

33. A process for the preparation of the unsaturated polyester as claimed in claim 1, comprising the reaction of a compound having the general formula (II);

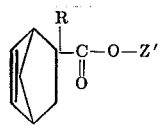

wherein R is a hydrogen atom or a lower alkyl radical having one to six carbon atoms and Z' represents a hydrogen atom, a lower alkyl radical having one to six carbon atoms or a hydroxyalkyl radical having one to six carbon atoms, and an unsaturated polyester having the general formula (III);

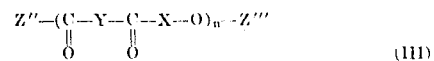

wherein X, Y and n are as defined in claim 1, Z'' is a hydroxyl radical or —O—X—OH wherein X is as defined claim 1 and Z''' is a hydrogen atom or

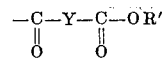

wherein Y is as defined in claim 1 and R' is a hydrogen atom or a lower alkyl radical having one to three carbon atoms at a temperature between 100°C. and 250°C.

34. A process for the preparation of the unsaturated polyester as claimed in claim 1 comprising the reaction of a compound having the general formula (II) as defined in claim 33, dicarboxylic acid having the general formula (IV);

wherein Y is as defined in claim 1, anhydride or esters thereof, at least 20 mole percent of which must be an α,β-unsaturated dicarboxylic acid, and diol having the general formula (V);

wherein X is as defined in claim 1, at a temperature between 100°C. and 250°C.

35. The process as claimed in claim 34, wherein the dicarboxylic acid (IV) is replaced by a tribasic or tetrabasic acid in an amount of 2 to 15 mole percent.

36. The process as claimed in claim 35, wherein the tribasic or tetrabasic acid is selected from the group consisting of trimellitic acid, pyromellitic acid and biphenyl-tetracarboxylic acid.

37. The process as claimed in claim 34, wherein the diol (V) is replaced by a triol or tetraol in an amount of 2 to 15 mole percent.

38. The process as claimed in claim 37, wherein the triol or tetraol is selected from the group consisting of trimethylolpropane, glycerine trimethylolethane, pentaerythritol and sorbitol.

39. The process as claimed in claim 33, wherein the compound (II) is replaced by a monofunctional compound selected from the group consisting of monoalcohols and monobasic acids in an amount of 5 to 50 mole percent.

40. The process as claimed in claim 34, wherein the compound (II) is replaced by a monofunctional compound selected from the group consisting of monoalcohols and monobasic acids in an amount of 5 to 50 mole percent.

* * * * *

UNITED STATES PATENT OFFICE
CERTIFICATE OF CORRECTION

Patent No. 3,715,330        Dated February 6, 1973

Inventor(s) NOGAMI ET AL

It is certified that error appears in the above-identified patent and that said Letters Patent are hereby corrected as shown below:

Claim 1, column 14, line 31, change "linear and branched alkylene radicals" to

--linear and branched alkenylene radicals--

Signed and sealed this 9th day of July 1974.

(SEAL)
Attest:

McCOY M. GIBSON, JR.
Attesting Officer

C. MARSHALL DANN
Commissioner of Patents